United States Patent Office 2,804,715
Patented Sept. 3, 1957

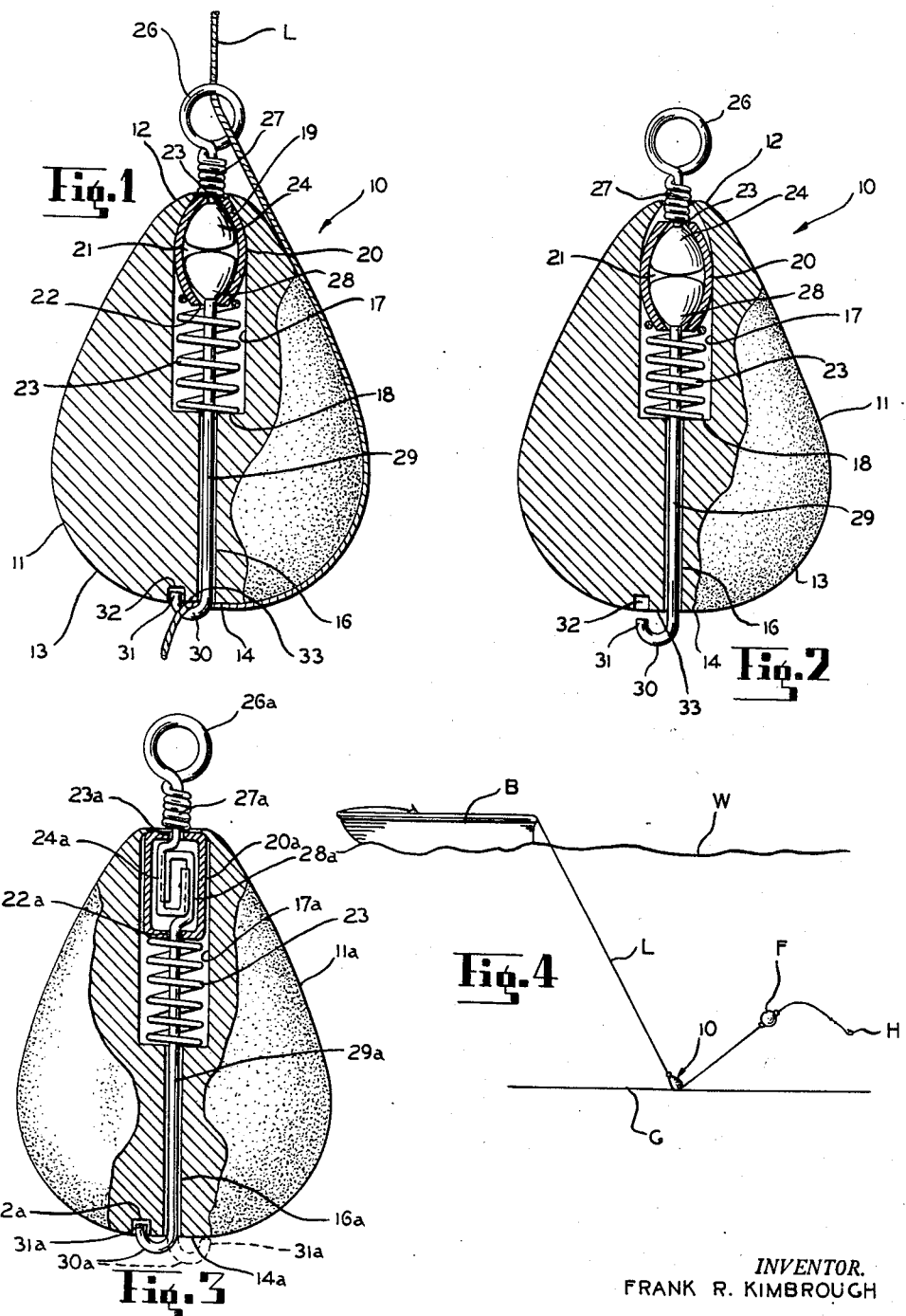

2,804,715
COMBINATION SNAP-ON AND SWIVELING SINKER

Frank R. Kimbrough, Richmond, Va., assignor to Ideal Fishing Float Company, Inc., Richmond, Va., a corporation of Virginia Application December 1, 1955, Serial No. 550,292

9 Claims. (Cl. 43—44.87)

This invention relates generally to fishing line sinkers and more particularly to a combination snap-on and swiveling sinker having a reciprocable spring-biased brass core equipped with a swivel eye at one end and a slidable hook at the other end, thereby affording an easy-on, easy-off selectively attachable and adjustable or locked fishing line sinker which can be used as either a slip-type sinker or a relatively stationary swivel sinker.

It is an object of the present invention to provide an easy-on, easy-off fishing line sinker.

Another object of the present invention is to provide a brass core sinker which may be conveniently used as a slip-type sinker.

Yet another object of the present invention is to provide a sinker which has an eye loop connecting means which is fully swivelable and which is particularly effective for use as a casting sinker as well as for trolling and still fishing.

Yet another object of the present invention is to provide a sinker of the type described which may be conveniently locked in place on a fishing line without tieing or crimping the sinker on the line.

Yet another object of the present invention is to provide a fishing line sinker which is readily adjustable on a fishing line.

A further object of the present invention is to provide a pear-shaped sinker for a fishing line which can be used either with the point up or the point down.

Yet another object of the present invention is to provide a pear-shaped fishing line sinker which provides a rounded end for snubbing over obstacles which are likely to be encountered in the environment of use.

Many other features, advantages and additional objects of the present invention will become manifest to those versed in the art upon making reference to the detailed description which follows and the accompanying sheet of drawings in which a preferred structural embodiment of a fishing line sinker provided in accordance with the principles of the present invention is shown by way of illustrative example.

On the drawings:

Figure 1 is an elevational view with parts broken away showing additional details of construction of a fishing line sinker provided in accordance with the principles of the present invention in cross-section, parts being illustrated in evelation to more clearly depict the structural features thereof;

Figure 2 is a view similar to Figure 1 but showing the movable components of the sinker repositioned to facilitate actuation of the brass core line fastening means;

Figure 3 is a view somewhat similar to Figures 1 and 2 and showing an alternative embodiment of the present invention; and Figure 4 is a somewhat schematic view illustrating one condition of use of the fishing line sinker of the present invention.

As shown on the drawings:

The fishing line sinker of the present invention is indicated generally by the reference numeral 10 and comprises a body 11 which is illustrated herein as being generally pear-shaped in configuration, although other shapes and forms are contemplated according to this invention. A convergent small end 12 and an enlarged end having rounded portions 13 terminating in an outer end wall indicated at 14 is provided so that in the orientation of Figure 1, the small end 12 constitutes the top of the sinker 10 and the end wall 14 constitutes the bottom.

Extending axially through the sinker body 11 is a longitudinal bore indicated at 16. The bore has an enlarged pocket 17 formed therein, one end of the pocket being bounded by a radially extending shoulder 18. The opposite end of the pocket 17 is initially open if the body constitutes a lead casting and thereafter a core subassembly is dropped in place and the portions adjacent the convergent end 12 may be peened over somewhat to provide shoulder means indicated at 19.

Slidably positioned within the bore 16 and the pocket 17 is a brass core provided in accordance with the principles of the present invention to function as a line fastening means. More specifically, the brass core includes a hollow barrel-type socket member 20 having a hollow interior space 21 and openings 22 and 23 formed at opposite ends thereof which register, respectively, with oppositely extending portions of the bore 16 disposed on the axis of the sinker body 11.

The socket member 20 is slidably disposed within the pocket 17 and is continuously biased in a given direction by a continuous biasing means taking the form of a coil spring 23 having one end bottomed against the medial shoulder 18 and having its other end bottomed against the socket member 20.

A first wire form member includes a retainer lug 24 which is positioned inside of the space 21 of the socket member 20 and extends outwardly through the opening 23 into the adjoining portion of the bore 16. The wire form member extends outwardly of the sinker body 11 and is shaped to provide an eye 26 or loop through which a fishing line indicated at L may be threaded or to which the fishing line L may be tied. The wire form member is coiled back upon itself as at 27 to abut against the outside of the socket member 20. Accordingly, because of the cooperation between the coils 27 and the retainer lug 24, the wire form member is precluded against relative axial movement with respect to the socket member 20 but a swivel connection is effected so that the eye 26 forms a swivel connection for the sinker 10.

It is highly desirable, of course, that the sinker have a free swiveling connection since this permits the use of the sinker without twisting the fishing line, for example, in bass casting and in trolling.

In accordance with the principles of the present invention, the socket member 20 is provided with additional line fastening means including a wire form member having a retainer lug 28 positioned in the space 21 inside of the socket member 20 and extending through the opening 22 into the adjoining portion of the bore 16. A straight shank or bar portion 29 is provided on the wire form member and extends outwardly of the body to the outer end 14. A hook 30 is formed on the end of the shank 29 and the end of the hook, as indicated at 31, is received in an opening or recess 32 formed in the outer end 14 of the sinker body 11 adjacent the bore 16. Thus, the bight portion of the hook 30 clamps securely against a retaining shoulder identified by the reference numeral 33 and lying between the edges of the recess 32 and the edges of the bore 16 to securely clamp against the fishing line L.

If it is desired to expose the end of the hook 31 to receive the fishing line L thereunder, the brass core is readily actuated by reciprocation thereof merely upon pushing the eye 26 downwardly whereupon the socket member 20 will slide in the pocket 17 and move the shank 29 axially to displace the hook 30 away from the outer wall 14 of the sinker body. Thus, the end of the hook 31 moves out of the recess 32. The view of Figure 1 shows the line L securely clamped by the hook 30 and the view of Figure 2 shows the hook 30 moved away from the end wall 14, the brass core having been actuated against the bias of the coil spring 23.

In the form of the invention illustrated in Figure 3, the lugs of the oppositely extending wire form members forming a part of the brass core of the sinker construction are locked for corotation with one another so that the hook may be angularly adjusted as well as reciprocably actuated. Thus, the form of the invention illustrated in Figure 3 includes a sinker body 11a having a bore 16a enlarged to provide a pocket 17a in which is slidably positioned a socket member 20a spring-biased in a given direction by a coil spring 23a and having openings at opposite ends indicated at 22a and 23a.

The first wire form member includes a lug 24a which takes the form of a generally C-shaped wire loop bent back upon itself and offset with respect to the main wire portion which extends through the opening 23a and outwardly of the sinker body 11a through an adjoining portion of the bore 16a. The first wire form member is bent to provide a loop or eye 26a and is coiled back upon itself as at 27a, which coils are closely spaced to the end of the socket member 20a.

The second wire form member also includes a lug 28a which takes the form of a bent wire loop engaging with the lug 24a to render the first and second wire form members corotatable. A shank portion 29a extends out of the socket member 20a through the opening 22a and into the adjoining portion of the bore 16a. A hook 30a is formed on the end of the shank 29a and has an end portion 31a received and seated in a recess 32a. If desired, the brass core of the fishing line sinker 11a may be reciprocably actuated to clear the end of the hook 31a out of the recess 32a whereupon the hook 30a may be repositioned in the dotted line position indicated in Figure 3 with the end of the hook 31a seated against the outer wall 14a. In this position, it will be appreciated that the hook 30a forms a second loop through which a fishing line may be slipped if such action is desired.

In Figure 4, an illustrative use of the fishing line sinker of the present invention is illustrated. A boat B is buoyantly supported on a body of water W and the fishing line L extends downwardly into the water W towards the bottom of the body of water indicated at G. The sinker 10 is shown adjustably fastened to a medial portion of the fishing line L and a float F is attached to the end of the fishing line L. A leader carrying a hook H is attached to the float F. Because the float F tends to rise and the fishing line sinker 10 remains on the bottom G, the hook H will be positioned in an optimum position with respect to the bottom of the body of water W for best fishing results. In order to selectively change the depth at which the hook H is positioned, the sinker 10 of the present invention may be quickly and conveniently adjusted along the length of the fishing line L. Instead of having to unknot and retie the line L to the sinker 10, the easy-on, easy-off sinker 10 of the present invention is quickly and conveniently adjusted to selectively vary the depth of the hook H.

It will be appreciated that the easy-on, easy-off sinker of the present invention still incorporates all of the advantages of a free-swiveling action if it is desired to use the sinker as a swiveling sinker or for trolling. At the same time, however, the sinker 10 or 10a can be conveniently and quickly locked in place at either end independently of both ends and may be easily adjusted at any particular point of connection on the fishing line.

If the sinker body is made of a pear-shaped configuration as herein illustrated with line-fastening means provided at opposite ends of the sinker body, the sinker 10 or 10a can be used with the point up or the point down. Moreover, if the sinker 10 or 10a is used with the point down by using the hook 30 or 30a as the line fastening means, then the rounded shoulders 13 at the enlarged end of the sinker body 11 tend to snub over obstacles which may be present in a fishing environment which action substantially eliminates snagging and loss of equipment.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. A fishing line sinker, comprising a pear-shaped body having an axial bore extending therethrough, said bore having an enlarged portion providing a pair of axially spaced shoulders in said bore, a coil spring in said enlarged portion of said bore bottomed against one of said shoulders, a barrel socket member in said bore engaged by said coil spring and biased against the other of said shoulders, an eye projecting out of the small end of said body and swivelly connected to said barrel socket member, and a bar carried by said socket projecting through said bore out of the larger end of said body, said bar having a hook formed on the end thereof clamped against said body by said coil spring, and a recess formed in said large end of said body adjacent said bore to receive the end of said hook for clamping a fishing line.

2. A fishing line sinker comprising a pear-shaped sinker body having a pocket formed therein, a coil spring in said pocket, and swivel means biased by said spring having an eye member swivelly connected thereto and projecting out of the top end of said body to receive and effect a slip attachment with a fishing line and a hook member connected to said swivel means and projecting out of and resiliently engaging the bottom end of said body to clamp a fishing line between the hook and the bottom end, said hook being temporarily spaced from said bottom end upon moving said swivel means against the spring-bias.

3. A fishing line sinker comprising, a body having a bore extending therethrough, said bore having an enlarged pocket formed therein adjacent one end of said body, a socket member slidably mounted in said pocket having opposite extending line fastening members slidably extending through opposite ends of said bore to the outside of said body to receive a fishing line, one of said line fastening members comprising an eye member swivelly connected to said socket inside of said pocket and being adaptable to attach the sinker to a fishing line as a slip-type sinker, the other of said line fastening members having a hook on the end thereof, the outer end of said body having an opening for receiving the end of said hook, and a coil spring in said pocket having one end abutting against said socket to bias said eye member outwardly and to bias said hook member against said body, whereupon said eye member may be pushed against said spring to expose the end of said hook for clamping a fishing line between said hook and said body, thereby to lock the sinker on the line.

4. A fishing line sinker comprising a pear-shaped body having a bore extending therethrough, said bore having an enlarged pocket formed therein providing a medial shoulder and an end shoulder adjacent a small end of the body, a coil spring in said pocket bottomed against said medial shoulder, and line fastening means retained in said pocket against said spring and biased by said spring in one direction, said line fastening means including a hook extending out of one end of said bore, said body having an opening in its outer surface in register with the end of said hook, whereby a fishing line may be clamped under the end of said hook, and means extending out of the other end of said bore to actuate said line fastening means against said spring thereby to selectively expose said hook.

5. A fishing line sinker comprising a body having a bore extending therethrough, said bore having an enlarged pocket formed therein providing a medial shoulder and an end shoulder adjacent one end of said body, a coil spring in said pocket bottomed against said medial shoulder, line fastening means in said pocket including a hollow socket member slidable in said pocket and engaging against said spring, said socket member having openings in opposite ends thereof in register with opposite extending portions of said bore, a first wire form member having a retainer lug inside of said socket member and extending out of one of said openings into a corresponding portion of said bore, said first wire form member being formed to provide an eye loop disposed outside of said body and being coiled back upon itself to abut against the outside of said socket member, thereby swivelly connecting said eye loop to said socket member while preventing relative axial movement therebetween, and a second wire form member having a retainer lug inside of said socket and extending out of the other of said openings into a corresponding portion of said bore, said second wire form member having a hook formed at the end thereof engaging the other end of said body to receive a fishing line, said eye loop actuating said socket and said second wire form member reciprocably to selectively expose said hook.

6. A fishing line sinker as defined in claim 5, said lugs on said wire form members comprising interengaging means locked for corotation with one another whereupon torque applied to said eye loop will be transmitted to said hook for effecting selective angular adjustment of said hook as well as reciprocable actuation thereof.

7. A fishing line sinker as defined in claim 6, said other end of said body having a recess formed in register with the end of said hook to receive the end of said hook, said hook being rotatably adjusted to seat in said recess or to seat on the outside surface of said sinker body.

8. A non-corrosive core sinker comprising a sinker body slidably carrying a spring-biased non-corrosive core having a swivel eye projecting outwardly of the body at one end for effecting a slip attachment of the sinker to a fishing line and a hook resiliently engaging the other end of the body, said core being movable against the spring-bias for temporarily spacing the hook from the said other end of the body to snap the sinker on a fishing line by clamping the line between the hook and the said other end of the body.

9. A fishing line sinker comprising a pear-shaped sinker body shaped to provide a convergent small end and an enlarged rounded end, a spring-biased non-corrosive core reciprocably mounted in said body having a swivel eye projecting out of said body at said convergent end of said core for effecting a slip attachment to a fishing line and a hook engaging said body at the other end for clamping a fishing line between the hook and the body, whereby a fishing line may be connected to either or both of said ends of said core.

References Cited in the file of this patent
UNITED STATES PATENTS

| 1,766,532 | Pflueger | June 24, 1930 |
| 2,065,854 | Edel et al. | Dec. 29, 1936 |
| 2,706,869 | Shoenfelt | Apr. 26, 1955 |
| 2,719,381 | Matras | Oct. 4, 1955 |